May 1, 1945.  W. A. RAY  2,374,895
FLUID CONTROL VALVE
Filed Nov. 12, 1941
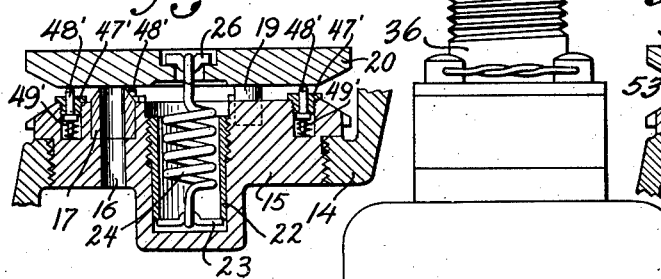
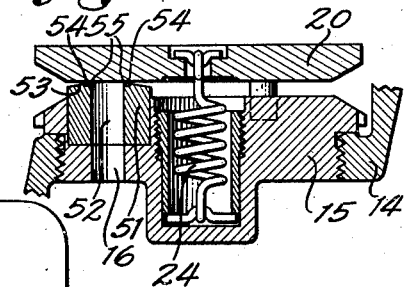
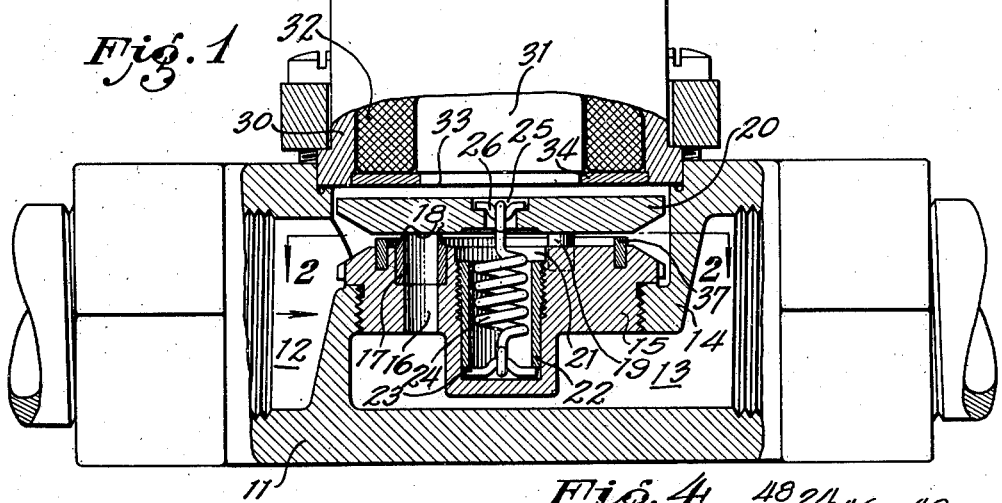
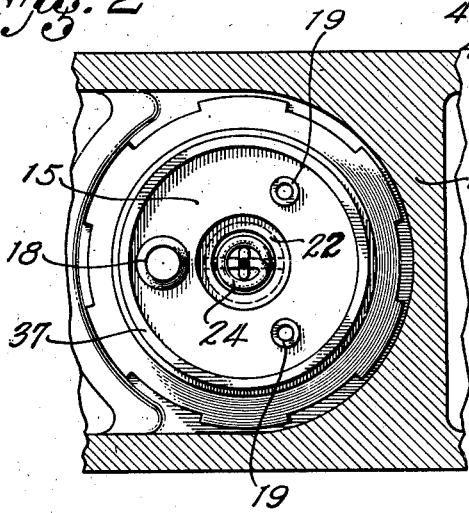
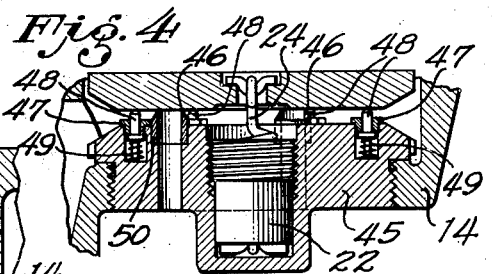
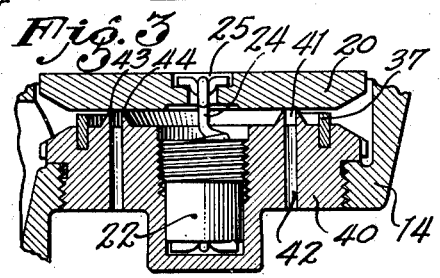
INVENTOR:
WILLIAM A. RAY
By John H. Rouse,
ATTORNEY.

Patented May 1, 1945

2,374,895

UNITED STATES PATENT OFFICE 2,374,895

FLUID CONTROL VALVE

William A. Ray, Los Angeles, Calif.

Application November 12, 1941, Serial No. 418,707

17 Claims. (Cl. 137—139)

My present invention relates to fluid control valves, and particularly to that type of valve wherein a relatively thin or disk-like closure member is arranged to be held upon its seat mainly by the pressure of the inlet fluid above it and is movable to open position substantially perpendicularly to its plane by means such as an electromagnet. So as to minimize friction in the movements of the closure member, and so that there is no hindrance to its proper seating, the closure member is usually loosely guided and hence can tilt to a considerable degree (mainly due to the uneven distribution of the fluid pressures) in its initial engagement with or final disengagement from the seat. Such tilting causes uneven wear of the seat (and hence leakage of the valve) when, as is usually the case in a valve of the type indicated, the seat-engaging face of the closure member is of rigid material and the seat is of the "knife-edged" type. It is therefore an object of the present invention to provide means for limiting the possible angularity of the closure member when it is in partial contact with its seat to a degree so small that uneven wear of the seat is substantially eliminated.

Another object of this invention is to provide, in a valve of the character described, means for limiting the degree of seat-wearing tilt of the closure member, which means is so positioned with respect to the seat that it does not introduce frictional resistance to the normal movement of the closure member.

Another object is to provide means engageable by the closure member (in its movement toward the seat) before it contacts any portion of the seat and effective only when the member is within a short distance from the seat, the means being yieldable so that in the final closing movement of the member it is in a plane substantially parallel to the seat.

In a valve of the general character described, when the pressure of the controlled fluid is high with respect to the amount of energy available for lifting the closure member or when weight considerations make it desirable to limit the power of the lifting means, it has been found desirable to apply the lifting force to the closure member asymmetrically so that it is tilted from its seat. Examples of such an arrangement are shown in my copending applications, Serial No. 326,022, filed March 26, 1940, (now Patent No. 2,294,421, granted September 1, 1942) and Serial No. 342,-493 filed June 25, 1940. The energy required to initially tilt the closure member of such a valve is far less than would be required to lift it evenly from its seat, and when initially tilted or "cracked" the fluid pressure tending to hold it on its seat is partially relieved so that only a small amount of power is then required to move it to its full-open position. However, such forceful tilting of the member on the seat soon causes uneven wear. It is therefore a particular object of this invention to provide means, similar to that described in the preceding objects, for limiting the degree of tile of the closure member, while it is still in engagement with its seat, to a very small amount.

Another object is the provision, in a "tilt" valve of the character described in the preceding paragraph, of means limiting to a small degree the angle of opening tilt of the closure member while it is still in engagement with its seat, which means also serves as an additional fulcrum for facilitating the continued movement of the member after it is out of engagement with the seat.

Other objects and advantages of this invention will be found in the description, the drawing and the appended claims; and for complete understanding of the invention, reference may be had to the following detailed description and acompanying drawing, wherein:

Figure 1 is a view, mainly in vertical section, of a valve embodying my invention;

Figure 2 is a fragmentary horizontal section taken along the line 2—2 of Fig. 1; and Figures 3, 4, 4a and 5 are fragmentary sectional views of modified forms of the invention.

Referring first to Figs. 1 and 2 of the drawing, the numeral 11 indicates a valve casing having an inlet 12 and an outlet 13 separated by a partition 14, in an opening through which is threaded a cylindrical partition-portion 15. Eccentrically located in this portion is a bore 16 fluidly interconnecting the inlet 12 with the outlet 13. In an enlarged upper end portion of the bore 16 is pressed a metal valve seat insert 17, the upper end of which extends above the top surface of the partition-portion. The insert 17 is bored coaxially with respect to the bore 16 and its outer side is tapered toward its upper end to form at its extremity a substantially knife-edged valve seat 18, which terminates in a horizontal plane. Stop pins 19 are pressed into openings located toward the edge of the partition-portion 15 away from the bore 16 so that their top surfaces are in the plane of the valve seat 18. These pins are preferably of tubular construction, as shown, so that the sum of the areas of their top surfaces may approximate the area of seat 18, wear of these parts thus being more evenly distributed.

The underside of a disk-like metallic closure member 20, of approximately the same diameter as the partition-portion 15 and positioned coaxially above the same, forms a plane surface cooperable with the seat 18 and the stop pins 19 on which it is normally evenly supported to insure proper sealing of the port of member 17. Centrally located in the partition-portion 15 and extending downwardly from the top side thereof is a recess 21, threaded for a portion of its length to receive a cylindrical metal sleeve 22, the bottom end of which forms an abutment for a pin 23 to secure one end of a tension spring 24 with respect to the partition-portion. The other end of the spring extends upwardly from the recess and through an opening 25 centrally located in the closure member 20 and is held at its upper end by a pin 26 abutting a shouldered portion of the opening 25.

Mounted on, and closing an opening in the upper wall of the casing 11, is an electromagnet having a cup-shaped outer core 30 and a solid cylindrical inner core 31, between the adjacent walls of which members is an energizing coil 32. The closure member 20 is of magnetic material and is adapted to be attracted to its open position by the electromagnet. A thin non-magnetic metal diaphragm 33 is clamped at its margin between the lower end of the outer core 30 and the casing 11 to seal the electromagnet members from the fluid controlled by the valve. The diaphragm 33 is made of non-magnetic material to form an air-gap between the closure member and the magnet core to prevent magnetic sticking of these parts when the magnet is deenergized. To prevent flexure of the diaphragm 33, and possible rupture thereof, a ring 34, made of non-magnetic material, is positioned at the lower end of the coil 32 and set in the shouldered lower ends of both the inner and outer cores to form an unbroken plane surface engaging the top surface of the diaphragm. Mounted on the top of the outer core 30 is a socket 36 for connecting the electromagnet to a source of energy.

Encompassing the valve seat 18 and stop pins 19, and symmetrically positioned with respect to the axis of the partition-portion 15, is a metallic ring 37, pressed into an annular recess in the top side of the partition-portion. The top surface of the guard ring 37 is positioned below, but closely adjacent the plane of the seat 18, the distance between the two varying upwardly from less than 0.001 inch depending upon the available accuracy of machining. In a practical embodiment of the valve, wherein the port opening is less than half inch in diameter and the guard ring is relatively close thereto, the distance between the top surfaces of the ring 37 and the seat 18 is between 0.001 and 0.0015 inch, which corresponds to an angle of tilt of less than 1°. Obviously such a small difference between the planes of the ring and the seat is permissible only when the materials of which the closure member and the seat insert are made are very hard, as is preferably the case. The closure member may conveniently be of a stainless steel alloy containing 16% chromium (the remainder mainly iron) which has relatively good magnetic properties. This "16 Chrome" material has a hardness of 30 Rockwell C. The material of the valve seat and of the guard ring may be of another stainless steel alloy (relatively non-magnetic) which contains 18% chromium and 8% nickel. This "18-8" material has an initial Brinell hardness of No. 140 which, by work-hardening during the operation of the valve, rapidly increases and can finally reach a hardness of No. 425 Brinell.

Assuming that the valve is connected to a supply of fluid under pressure, with the parts in the positions shown in Fig. 1, the electromagnet being unenergized, the closure member 20 is held on its seat principally by the pressure of the fluid above it, the force of spring 24 being relatively small. The pressure of the fluid on the closure member 20 is effective only directly above the seat 18. While the stop pins 19 are tubular, it is not intended that the closure member make fluid-tight engagement therewith, and these pins therefore serve in the same manner as if they were of solid construction. If the electromagnet is now energized, it will exert an axial force on closure member 20, but, since the force of the fluid is in an opposite direction and asymmetric with respect thereto, the closure member will be tilted on the edge of its seat until such time as it contacts the ring 37. It will be seen that a mechanical advantage has been effected by tilting the closure member on the edge of the seat since the distance from the center of pressure of the electromagnetic force to the fulcrum edge of the seat is much greater than the distance from the center of pressure of the resisting force of the fluid to that edge. It is thus possible to use an electromagnetic force, which is weak in comparison with the fluid force, to crack the valve open, when, the difference in pressures above and below the closure member being thereby substantially reduced, the magnetic force can continue to tilt the closure member about the ring 37 as a fulcrum although the mechanical advantage has been reduced. The ring 37 serves two purposes during the opening movement of the valve. First, by limiting the degree of tilt that the closure member may assume while in contact with the seat, uneven wear is reduced to a minimum. Second, the distance between the seat-adjacent portion of the closure member and the adjacent portion of the core 30 is less when the closure member is in its maximum tilted position than it would be were there no guard ring, and raising of the closure member to its fully-open position by the electromagnet is thus facilitated. In valves, such as the one described, where the lift of the closure member is only about 0.025 inch this latter feature is of considerable importance.

In the modified form of my invention shown in Fig. 3, all of the forces acting on the closure member 20 may be considered as coaxial. The particular valve structure shown in this figure is described and claimed in Patent No. 2,261,562 issued to me November 4, 1941, and is generally used in systems where the pressure of the fluid to be controlled is relatively low. The numeral 40 indicates the partition-portion which in this instance is provided in its top surface with an annular recess 41 which is connected to the valve outlet by openings 42. The surface of the partition-portion surrounding the recess is relieved to provide, with the walls of the recess, two knife-edged valve seats 43 and 44 which terminate in a plane. By this arrangement increased flow results when the closure member is lifted but a short distance above its seat, additional fluid from the inlet then flowing through the opening 25 and across the inner seat. The guard ring 37 is positioned concentrically with respect to the valve seats and its top surface lies parallel to and just below them.

In the symmetric arrangement of Fig. 3, the means for raising the closure member from its seat does not in itself effect tilting of the member, but the member is nevertheless tilted by the unequal distribution of the fluid pressure upon it as the fluid starts to flow around it. Also, in the movement of the member toward its closed position, the downward force of the fluid upon the member is greater toward the edge of the member adjacent the valve inlet, so that it is again tilted; this also being the case in the valve shown in Fig. 1. The harmful effect upon the seat of the tilting of the member is reduced to a minimum by the provision of the guard ring 37 for limiting to a very small angle the degree of tilt the member may assume while in contact with a portion of the seat. The guard ring also decreases the harmful effect of the impact of the closure member on the seat by directly absorbing part of the blow, and also by providing a dash-pot effect by temporarily restricting the escape of fluid between the closure member and that section of the partition-portion surface encircled by the ring.

In Fig. 4 is shown a valve structure generally used for controlling fluids under relatively low pressures, the valve opening and closing forces being symmetric as in the structure shown in Fig. 3. Pressed in the upper ends of openings extending through the partition-portion 45, and equally spaced on a circle concentric therewith, are three metal inserts 50 providing knife-edged valve seats 46 terminating in a single plane above the top surface of the partition-portion. Also in the top side of partition-portion 45 are six openings equally spaced on a circle concentric with and encompassing that of the valve seats. Threaded into each of these openings is a guide bushing 47, in each of which a pin 48 is reciprocable. The pin is urged toward its upper position by a compression spring 49, and its movement in this direction is limited by the engagement of an enlarged medial portion of the pin with the lower end of the bushing 47; its downward movement being limited by the engagement of its lower end with the bottom wall of the opening. In its raised position, the top end of the guard pin 48 preferably extends but slightly above the plane of the seats, and in its lowermost position (if the closure member is tilted) it is in a position similar to that of the fixed guards shown in Figs. 1 and 3. In operation, the yieldable guard pins 48 function in a manner similar to the guard ring of Figs. 1 and 3, but possess the additional advantage that in the closing movement of the valve, the closure member engages the tilt-limiting means before it can possibly contact the valve seats, and thus upon further downward movement will engage all of the seats substantially simultaneously. Cushioning of the impact between the closure member and the seats is effected by the springs 49, but the total force of these springs is preferably less than that of the spring 24 as it is undesirable to depend entirely upon fluid pressure to close the valve.

Obviously, the yieldable guard pins could also be employed in tilt valves such as that shown in Fig. 1 wherein the opening and closing forces are asymmetric and the guard means provide an auxiliary fulcrum. Such an arrangement is illustrated in Fig. 4a, the showing of which corresponds to that of Fig. 1 except that, in place of the rigid guard ring 37 of that figure, there is substituted a plurality of yieldable guard pins 48'. These pins, and their associated parts, are identical in construction and function to those described in connection with Fig. 4, and therefore have been assigned corresponding numerals with prime marks added.

In Fig. 5 is shown a modification particularly useful in "tilt valves" of the type illustrated in Fig. 1 in which the forces acting on the closure member are asymmetric. A metal insert 51 is pressed into the enlarged upper end portion of the opening 16 and is provided with a passageway 52 in register with the opening 16. The top surface 53 of the insert 51 forms a segment of a sphere of large radius, and provides an annular groove 54 around the upper end of the passageway 52 to form a knife-edged valve seat 55. The principal advantage of this construction is that, as the closure member is tilted in its opening movement, the fulcrum is constantly shifting on the curved surface 53 as the angle of tilt changes. This permits the lever arm of the fluid force to lengthen only as this force decreases due to further opening of the valve. By this construction the angle of tilt of the closure member while in engagement with a portion of the seat can be limited to a very few minutes of arc without suddenly increasing the length of the lever arm of the fluid force. In its downward movement the angle of tilt is limited by the curved surface 53 or by the fixed stop pins 19, the upper ends of which terminate in the same plane as the seat.

While I have herein shown and described, by way of illustration, specific embodiments of my invention, I wish it to be understood that modifications may be made without departing from the spirit of the invention and that I intend therefore to be limited only by the scope of the appended claims.

I claim as my invention:

1. In a fluid control valve: means forming a valve seat terminating in a plane, a closure member cooperable with said seat to control fluid flow through the valve, said closure member being reciprocable along an axis substantially perpendicular to the plane of the seat and being so loosely guided and otherwise arranged within the valve that a tilting of the closure member on the seat may occur, and means for reducing leak-producing wear of the seat in continued operation of the valve, comprising means of hard material, mounted on a fixed part of the valve structure and so positioned with respect to the seat as to be engageable by a portion of the closure member in its movements, for limiting the tilt of the closure member on the seat in its initial engagement with and final disengagement from the seat to an angle not exceeding substantially two degrees.

2. In a fluid control valve: means forming a valve seat terminating in a plane, a disk-like closure member cooperable with said seat to control fluid flow through the valve and movable in directions toward and away from and substantially perpendicular to the plane of the seat, said closure member being so loosely guided and otherwise arranged within the valve that a tilting of the closure member on the seat may occur, and means for reducing leak-producing wear of the seat in continued operation of the valve, comprising means of hard material, so fixedly positioned with respect to the seat as to be engageable by said closure member in its movements, for limiting the tilt of the closure member on the seat in its initial engagement with and final disengagement from the seat to an angle not exceeding substantially two degrees.

3. In a fluid control valve: means forming a valve seat terminating in a plane, a closure member cooperable with said seat to control fluid flow through the valve, said closure member being reciprocable along an axis substantially perpendicular to the plane of the seat and being so loosely guided and otherwise arranged within the valve that a tilting of the closure member on the seat may occur, and means for reducing leak-producing wear of the seat in continued operation of the valve, comprising means of hard material, mounted on a fixed part of the valve structure and positioned adjacent the plane of the seat and engageable by the closure member in its movements, for limiting the tilt of the closure member on the seat in its initial engagement with and final disengagement from the seat to an angle not exceeding substantially two degrees.

4. In a fluid control valve: means forming a valve seat terminating in a plane, a disk-like closure member cooperable with said seat to control fluid flow through the valve and movable in directions toward and away from and substantially perpendicular to the plane of the seat, said closure member being so loosely guided and otherwise arranged within the valve that a tilting of the closure member on the seat may occur, and means for reducing leak-producing wear of the seat in continued operation of the valve, comprising means of hard material, mounted on a fixed part of the valve structure and positioned closely adjacent the plane of the seat on the side of said plane away from the closure member and engageable by an extended portion of the closure member in its movements, for limiting the tilt of the closure member on the seat in its initial engagement with and final disengagement from the seat to an angle not exceeding substantially two degrees, the arrangement being such that the closure member is disengaged from said tilt-limiting means when the valve is in fully-open condition.

5. In a fluid control valve: means forming a valve seat terminating in a plane, a disk-like closure member cooperable with said seat to control fluid flow through the valve and movable in directions toward and away from and substantially perpendicular to the plane of the seat, said closure member being so loosely guided and otherwise arranged within the valve that a tilting of the closure member on the seat may occur, and means for reducing leak-producing wear of the seat in continued operation of the valve, comprising guard means of hard material mounted on a fixed part of the valve structure and positioned adjacent the plane of the seat and radially thereof on the side of said plane away from the closure member, said guard means being engageable by a seat-overlapping portion of said closure member in its movements for limiting the tilt of the closure member when it is in engagement with a portion of the seat to an angle not exceeding substantially two degrees, the arrangement being such that the closure member is disengaged from said guard means when the valve is in fully-open condition.

6. In a fluid control valve: means forming a valve seat terminating in a plane, a closure member cooperable with said seat to control fluid flow through the valve, said closure member being reciprocable along an axis substantially perpendicular to the plane of the seat and being so loosely guided and otherwise arranged within the valve that a tilting of the closure member on the seat may occur, and means for reducing leak-producing wear of the seat in continued operation of the valve, comprising yieldable means, so positioned with respect to the seat as to be engageable by a portion of the closure member during its movements, for limiting the degree of tilt of the closure member on the seat in its initial engagement with or final disengagement from the seat to an angle so small that uneven wear of the seat by the closure member is reduced to a minimum.

7. In a fluid control valve: means forming a valve seat terminating in a plane, a disk-like closure member cooperable with said seat to control fluid flow through the valve and movable in directions toward and away from and substantially perpendicular to the plane of the seat, said closure member being so loosely guided and otherwise arranged within the valve that a tilting of the closure member on the seat may occur, and means for reducing leak-producing wear of the seat in continued operation of the valve, comprising yieldable stop-means positioned adjacent the plane of the seat and radially thereof, said stop-means being engageable by a seat-overlapping portion of the closure member during its movements for limiting the degree of tilt said closure member can assume when in engagement with a portion of said seat to an angle so small that uneven wear of the seat by the closure member is reduced to a minimum.

8. In a fluid control valve: means forming a valve seat terminating in a plane, a closure member cooperable with said seat to control fluid flow through the valve, said closure member being reciprocable along an axis substantially perpendicular to the plane of the seat and being so loosely guided and otherwise arranged within the valve that a tilting of the closure member on the seat may occur, and means for reducing leak-producing wear of the seat in continued operation of the valve, comprising resilient means normally positioned adjacent the plane of the seat and on the side of said plane toward the closure member, said resilient means being engageable by a portion of said closure member in its movements and yieldable to a position closely adjacent the side of the plane away from the closure member for limiting the degree of tilt of the closure member on the seat in its initial engagement with or final disengagement from the seat to an angle so small that uneven wear of the seat by the closure member is reduced to a minimum.

9. In a fluid control valve: means forming a plurality of valve seats all terminating in the same plane, a disk-like closure member cooperable with said seats to control fluid flow through the valve, said closure member being reciprocable along an axis substantially perpendicular to the plane of said seats and so loosely guided and otherwise arranged within the valve that a tilting of the closure member on the seats may occur, and means for reducing leak-producing wear of the seat in continued operation of the valve, comprising means of hard material, encompassing said seats and so positioned with respect thereto as to be engageable by a seat-overlapping portion of the closure member in its movements, for limiting the tilt of the closure member on the seats in its initial engagement with and final disengagement from a portion of a seat to an angle not exceeding substantially two degrees, the arrangement being such that the closure member is disengaged from said tilt-limiting means when the valve is in fully-open condition.

10. In a fluid control valve: means forming a valve seat terminating in a plane, a closure member movable toward and away from said seat and cooperable therewith, said closure member being so loosely guided and otherwise arranged within the valve that a tilting of the closure member on the seat may occur, a portion of the seat forming a fulcrum about which the closure member can tilt, and means for reducing leak-producing wear of the seat in continued operation of the valve, comprising means of hard material so positioned with respect to the seat as to be engageable by a portion of the closure member during its movements for limiting to an angle not exceeding substantially two degrees the tilt of the closure member when the same is in contact with a portion of the seat, said last-named means also forming an auxiliary fulcrum about which the closure member may tilt when it is out of engagement with the seat, the arrangement being such that the closure member is disengaged from said tilt-limiting means when the valve is in fully-open condition.

11. In a fluid control valve: a casing having a inlet and an outlet separated by a ported partition provided with a valve seat on the inlet side of said partition, a freely-tiltable loose closure member cooperable with said seat and movable in directions toward and away from the same, said closure member being urged toward the seat by the pressure of the fluid in the inlet, electromagnetic means for moving the closure member away from its seat, the center of pressure of said electromagnetic means being asymmetric with respect to the port for affecting the closure member to tilt on the seat, and means for reducing leak-producing wear of the seat in continued operation of the valve, comprising means of hard material so positioned with respect to the seat as to be engageable by said closure member for limiting to an angle not exceeding substantially two degrees the tilt of the closure member when the same is in contact with a portion of the seat, said last-named means also forming an auxiliary fulcrum about which the closure member can tilt when it is entirely out of engagement with the seat, the arrangement being such that the closure member is disengaged from said tilt-limiting means when the valve is in fully-open condition.

12. In a fluid control valve: a casing having an inlet and an outlet separated by a ported partition provided with a valve seat terminating in a plane on the inlet side of said partition, a freely-tiltable closure member cooperable with said seat and movable in directions substantially perpendicular to the plane of the seat and toward and away from the same, said closure member being urged toward the seat by the pressure of fluid in said inlet, electromagnetic means for moving the closure member away from its seat, the center of pressure of said electromagnetic means being asymmetric with respect to the port for affecting the closure member to tilt on its seat, and means for reducing leak-producing wear of the seat in continued operation of the valve, comprising means of hard material so positioned with respect to the seat as to be engageable by a seat-overlapping portion of the closure member to limit to an angle not exceeding substantially two degrees the tilt of the closure member when the same is in contact with a portion of the seat, said last-named means also forming an auxiliary fulcrum about which the closure member can tilt when it is entirely out of engagement with the seat, the arrangement being such that the closure member is disengaged from said tilt-limiting means when the valve is in fully-open condition.

13. In a fluid control valve: a casing having an inlet and an outlet separated by a ported partition provided with a valve seat terminating in a plane on the inlet side of said partition, a freely-tiltable loose closure member cooperable with said seat and movable in directions toward and away from the same, said closure member being urged toward the seat by the pressure of the fluid in said inlet, electromagnetic means for moving the closure member away from its seat, the center of pressure of said electromagnetic means being asymmetric with respect to the port for affecting the closure member to tilt on said seat, and means for reducing leak-producing wear of the seat in continued operation of the valve, comprising means of hard material positioned adjacent the plane of the seat and engageable by an overlapping portion of the closure member to limit to an angle not exceeding substantially two degrees the tilt of the closure member when the same is in contact with a portion of the seat, said last-named means also forming an auxiliary fulcrum about which the closure member can tilt when it is entirely out of engagement with the seat, the arrangement being such that the closure member is disengaged from said tilt-limiting means when the valve is in fully-open condition.

14. In a fluid control valve: a casing having an inlet and an outlet separated by a ported partition provided with a valve seat on the inlet side of said partition, a freely-tiltable loose closure member cooperable with said seat and movable in directions toward and away from the same, said closure member being urged toward the seat by the pressure of the fluid in the inlet, electromagnetic means for moving the closure member away from its seat, the center of pressure of said electromagnetic means being asymmetric with respect to the port for affecting the closure member to tilt on the seat, and means for reducing leak-producing wear of the seat in continued operation of the valve, comprising yieldable means positioned non-axially of said port and engageable by said closure member during its movements for limiting to a small angle the degree of tilt of the closure member when the same is in contact with a portion of the seat, said yieldable means also forming an auxiliary fulcrum about which the closure member can tilt when it is entirely out of engagement with the seat.

15. In a fluid control valve: a casing having an inlet and an outlet separated by a ported partition provided with a valve seat terminating in a plane on the inlet side of said partition, a freely-tiltable closure member cooperable with said seat and movable in directions substantially perpendicular to the plane of the seat and toward and away from the same, said closure member being urged toward the seat by the pressure of the fluid in said inlet, electromagnetic means for moving the closure member away from its seat, the center of pressure of said electromagnetic means being asymmetric with respect to the port for affecting the closure member to tilt on its seat, and means for reducing leak-producing wear of the seat in continued operation of the valve, comprising yieldably-mounted means so positioned with respect to the seat as to be engageable by a portion of the closure member to limit to a small angle the degree of tilt of the closure member when the same is in contact with a portion of the seat, said yieldably-mounted means also forming an auxiliary fulcrum about which the closure member can tilt when it is entirely out of engagement with the seat.

16. In a fluid control valve: a casing having an inlet and an outlet separated by a ported partition provided with a valve seat terminating in a plane on the inlet side of said partition, a freely-tiltable closure member cooperable with said seat and movable in directions substantially perpendicular to the plane of the seat and toward and away from the same, said closure member being urged toward the seat by the pressure of fluid in said inlet, electromagnetic means for moving the closure member away from its seat, the center of pressure of said electromagnetic means being asymmetric with respect to the port for affecting the closure member to tilt on its seat, and means for reducing leak-producing wear of the seat in continued operation of the valve, comprising yieldable means normally positioned adjacent the plane of the seat and on the side of the plane toward the closure member, said means being engageable by said closure member and being movable to a position closely adjacent the side of the plane away from the closure member for limiting to a small angle the degree of tilt of the closure member when the same is in contact with a portion of the seat, said yieldable means also forming an auxiliary fulcrum about which the closure member can tilt when it is entirely out of engagement with the seat.

17. In a fluid control valve: a casing having an inlet and an outlet separated by a ported partition provided with a valve seat on the inlet side of said partition, a freely-tiltable loose closure member cooperable with said seat and movable in directions toward and away from the same, said closure member being urged toward the seat by the pressure of the fluid in the inlet, electromagnetic means for moving the closure member away from its seat, the center of pressure of said electromagnetic means being asymmetric with respect to the port for affecting the closure member to tilt on the seat, and means for reducing leak-producing wear of the seat in continued operation of the valve, comprising means of hard material so positioned with respect to the seat as to be engageable by said closure member during its movement for limiting to an angle not to exceed substantially two degrees the tilt of the closure member when the same is in contact with a portion of the seat, said last-named means also forming an auxiliary fulcrum about which the closure member can tilt when it is entirely out of engagement with the seat.

WILLIAM A. RAY.